US012724719B2

(12) United States Patent
Santiago-Fernandez et al.

(10) Patent No.: US 12,724,719 B2
(45) Date of Patent: Sep. 1, 2026

(54) CONDENSED MEMORY-MANAGEMENT PROTECTION IN MULTI-TENANT SYSTEMS

(71) Applicant: International Business Machines Corporation, Armonk, NY (US)

(72) Inventors: William Santiago-Fernandez, Hopewell Junction, NY (US); Tamas Visegrady, Zurich (CH); Silvio Dragone, Olten (CH)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 18/786,528

(22) Filed: Jul. 28, 2024

(65) Prior Publication Data

US 2026/0030176 A1 Jan. 29, 2026

(51) Int. Cl.
*G06F 12/14* (2006.01)
*G06F 13/16* (2006.01)

(52) U.S. Cl.
CPC ...... *G06F 12/1483* (2013.01); *G06F 12/1441* (2013.01); *G06F 13/1668* (2013.01)

(58) Field of Classification Search
CPC ............. G06F 12/1483; G06F 12/1441; G06F 13/1668
See application file for complete search history.

(56) References Cited

U.S. PATENT DOCUMENTS

2015/0097847 A1* 4/2015 Dunaisky ................. G09G 5/39 345/531
2019/0324855 A1 10/2019 Yeh et al.
2020/0174688 A1 6/2020 Santiago Fernandez et al.
2021/0034545 A1 2/2021 Palmer et al.
2022/0067513 A1* 3/2022 Stevens ...................... G06F 7/22
2022/0374349 A1* 11/2022 Chisnall .............. G06F 12/1441
2023/0091722 A1 3/2023 Hsiao et al.
2024/0160571 A1* 5/2024 Landers .............. G06F 12/0877
2024/0281369 A1* 8/2024 Palmer ................ G06F 12/0246
2024/0403177 A1* 12/2024 Lim .................... G06F 11/2084

OTHER PUBLICATIONS

Watson et al., Capability Hardware Enhanced RISC Instructions: CHERI Instruction-Set Architecture, Apr. 2014.
Gras et al., Translation Leak-Aside Buffer: Defeating Cache Side-Channel Protections with TLB Attacks, SEC'18: Proceedings of the 27th USENIX Conference on Security Symposium, pp. 955-972, Aug. 15, 2018.

* cited by examiner

*Primary Examiner* — Zhuo H Li
(74) *Attorney, Agent, or Firm* — Kristofer Haggerty

(57) ABSTRACT

An embodiment includes configuring a configuration of a crossbar of a memory management unit comprising a set of regions of N workers and D partitions. The embodiment includes writing by a worker, to D partitions in the set of regions of the crossbar. The embodiment also includes reading by a partition, N regions in the set of regions of the crossbar where each of the N regions is assigned an address that is mapped to a physical memory address and where an access control is achieved by the configuration of a N plus D mapping of workers to partitions of the crossbar of the memory management unit.

20 Claims, 6 Drawing Sheets

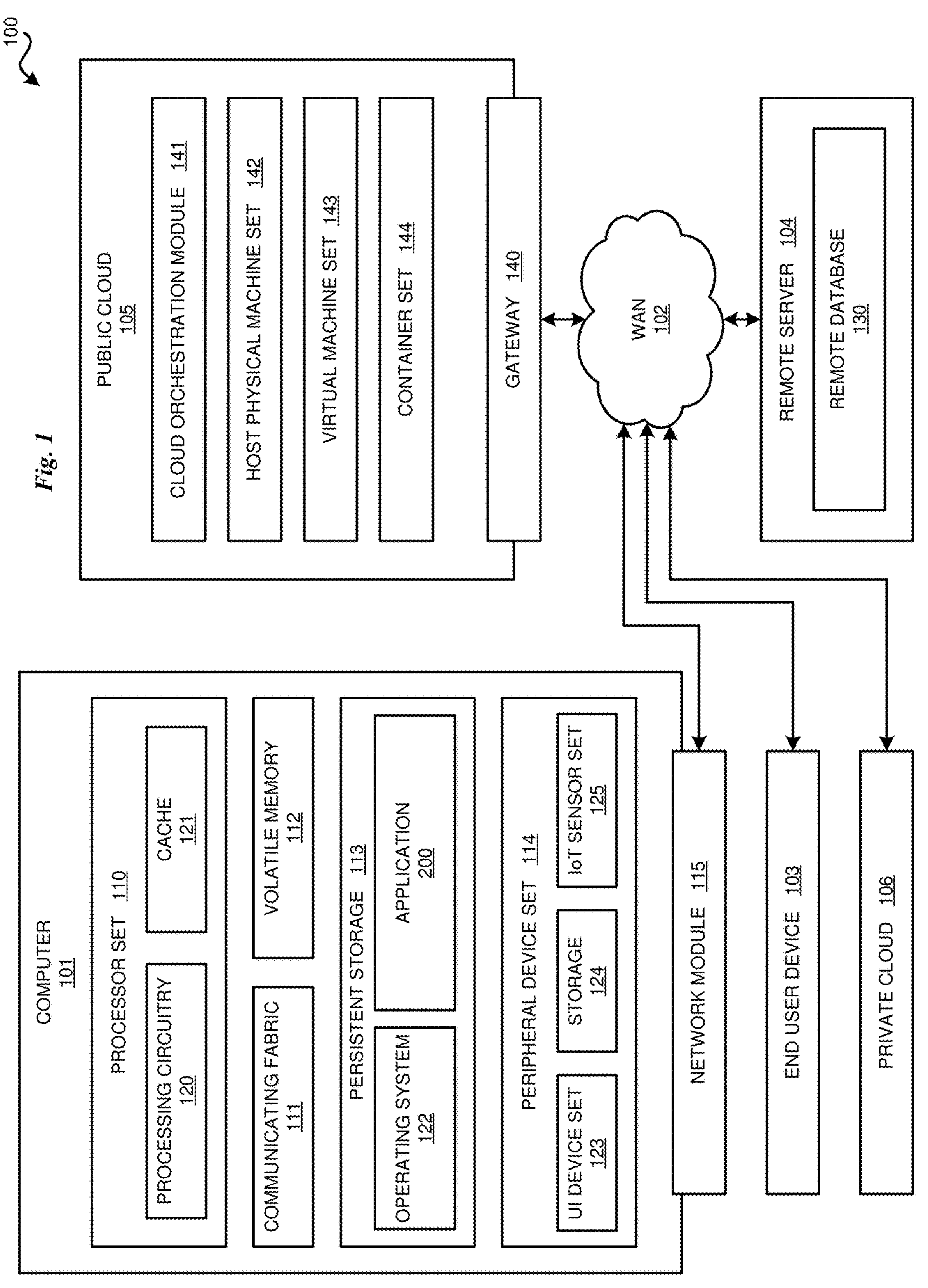
100
Fig. 1
PUBLIC CLOUD
105
CLOUD ORCHESTRATION MODULE 141
HOST PHYSICAL MACHINE SET 142
VIRTUAL MACHINE SET 143
CONTAINER SET 144
GATEWAY 140
WAN
102
REMOTE SERVER 104
REMOTE DATABASE
130
COMPUTER
101
PROCESSOR SET 110
PROCESSING CIRCUITRY
120
CACHE
121
COMMUNICATING FABRIC
111
VOLATILE MEMORY
112
PERSISTENT STORAGE 113
OPERATING SYSTEM
122
APPLICATION
200
PERIPHERAL DEVICE SET 114
UI DEVICE SET
123
STORAGE
124
IoT SENSOR SET
125
NETWORK MODULE 115
END USER DEVICE 103
PRIVATE CLOUD 106

300
PHYSICAL MEMORY 340
2>3
350
360
330
310
WORKER 1 WRITE ACCESS
1>1 [W]
1>2 [W]
1>3 [W]
WORKER 2 WRITE ACCESS
2>1 [W]
2>2 [W]
2>3 [W]
TO PARTITION 1
TO PARTITION 2
TO PARTITION 3
320
FROM WORKER 1
FROM WORKER 2
PARTITION 1 READ ACCESS
1>1 [R]
2>1 [R]
PARTITION 2 READ ACCESS
1>2 [R]
2>2 [R]
PARTITION 3 READ ACCESS
1>3 [R]
2>3 [R]

500
PARTITION 1
PARTITION 2
PARTITION 3
PARTITION 4
540
520
530
WORKER A
WORKER B
REGION 1
REGION 2
REGION 3
REGION 4
REGION 5
REGION 6
REGION 7
REGION 8
550
A>1 at x01000 [up to x01fff]
A>2 x02000
A>3 x03000
A>4 x04000 [up to x04fff]
B>1 x11000
B>2 x12000 ...
B>3 x13000
B>4 x14000 [up to x14fff]
560
A> at x01000 [up to x04fff] condenses A>1 | A>2 | A>3 | A>4
B> x11000 [up to x14fff] ... B>1 | B>2 | B>3 | B>4
570
>1 at x10f000 [up to 0x110fff] condenses A>1 | B>1
>2 x20f000
>3 x30f000
>4 x40f000 [up to 0x410fff]
580
bit 22 | bit 21 | bit 20 -> bit 14 | bit 13 | bit 12
bit 16 -> bit 20
590
...>1
x10f000 -> bits 22..20 | bit 16 = 001 | 0 -> x01000 (A>1)
x110000 -> 001 | 1 -> x11000 (B>1)
...>2
x20f000 -> 010 | 0 -> x02000 (A>2)
x210000 -> 010 | 1 -> x12000 (A>2)
...>3
x30f000 -> 011 | 0 -> x03000 (A>3)
x310000 -> 011 | 1 -> x13000 (A>3)
...>4
x40f000 -> 100 | 0 -> x04000 (A>4)
x410fff -> 100 | 1 -> x14fff (B>4)

CONDENSED MEMORY-MANAGEMENT PROTECTION IN MULTI-TENANT SYSTEMS

BACKGROUND

The present invention relates generally to memory management. More particularly, the present invention relates to a method, system, and computer program for Condensed Memory-management Protection in Multi-tenant Systems.

High-assurance systems with multiple tenants frequently use separation kernels as partitioning systems, and align software partitions to coincide with memory-protection features provided by hardware memory-management units (MMUs). Security-conscious microkernels, typically used to manage such partitions, dedicate message-passing pipes for each possible pair of writers and readers to ensure separation. A straightforward security technique is to restrict each communication pipe into its own MMU-managed memory region, and therefore provide hardware-enforced separation. A separate MMU-level unit for all pairs of partitions ensures that only specific writers and readers have access to each shared memory region.

SUMMARY

The illustrative embodiments provide for Condensed Memory-management Protection in Multi-tenant Systems. An embodiment includes configuring a configuration of a crossbar of a memory management unit comprising a set of regions of N workers and D partitions. The embodiment includes writing by a worker, to D partitions in the set of regions of the crossbar. The embodiment also includes reading by a partition, N regions in the set of regions of the crossbar where each of the N regions is assigned an address that is mapped to a physical memory address and where an access control is achieved by the configuration of a N plus D mapping of workers to partitions of the crossbar of the memory management unit.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 1 depicts a block diagram of a computing environment in accordance with an illustrative embodiment;

DETAILED DESCRIPTION

Figure 2:
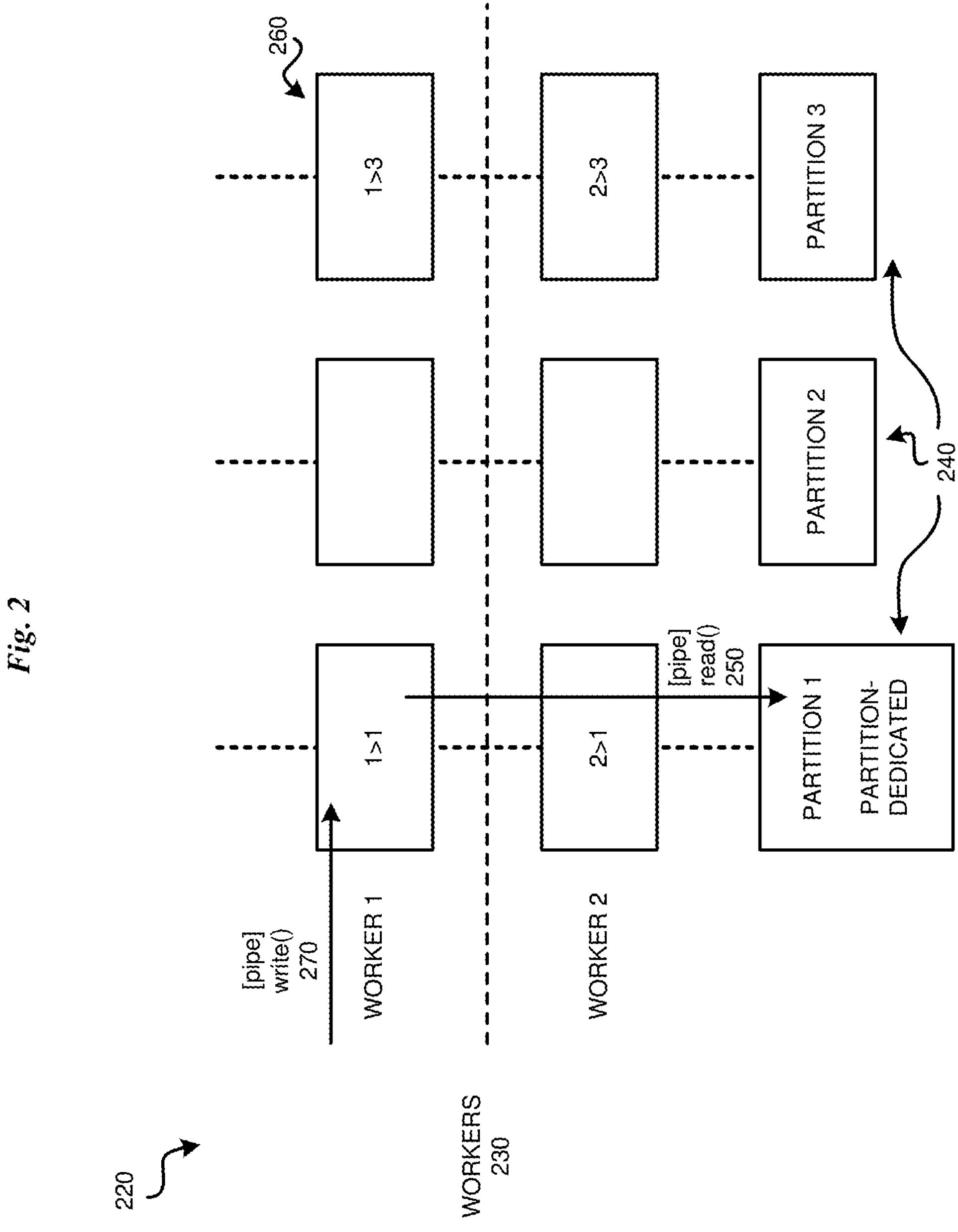
FIG. 2 depicts a diagram in an environment in accordance with an illustrative embodiment.

High-assurance systems with multiple tenants frequently use separation kernels as partitioning systems, and align software partitions to coincide with memory-protection features provided by hardware memory-management units (MMUs). Security-conscious microkernels, typically used to manage such partitions, dedicate message-passing pipes for each possible pair of writers and readers to ensure separation. A straightforward security technique is to restrict each communication pipe into its own MMU-managed memory region, and therefore provide hardware-enforced separation. A separate MMU-level unit for all pairs of partitions ensures that only specific writers and readers have access to each shared memory region.

While dedicated mapping of each possible region is straightforward, the number of simultaneous mapping scales with the product of worker plus partition counts, for instance, the product of N and D for N workers and D partitions. Even with modest number of partitions, the number of MMU mappings grows beyond static MMU-table capacities, and necessitates MMU reconfiguration at runtime. Unfortunately, such dynamic reconfiguration also remains a source of possible security problems.

The following description provides examples of embodiments of the present disclosure, and variations and substitutions may be made in other embodiments. Several examples will now be provided to further clarify various aspects of the present disclosure.

Example 1: A computer-implemented method that comprises configuring a configuration of a crossbar of a memory management unit comprising a set of regions of N workers and D partitions. The method further comprises writing by a worker, to D partitions in the set of regions of the access control. The method further comprises reading by a partition, N regions in the set of regions of the access control where each of the N regions is assigned an address that is mapped to a physical memory address and wherein an access control is achieved by the configuration of a N plus D mapping of workers to partitions of the crossbar of the memory management unit.

The above limitations advantageously enable access control by a N plus D mapping of workers to partitions. Thus, the N plus D mapping achieves the equivalent security access control of the product of N and D mapping. Aspects of the present disclosure improve the security of a memory management unit of a computer by reducing the number of mappings. For a reasonable worker count N and partition count D would allow most state-of-the-art microprocessors to avoid reconfiguring the MMU at runtime. Not reconfiguring the MMU obviously eliminates categories of attacks which depend on MMU-reconfiguration artifacts revealing data through side channels.

Example 2: The limitations of Example 1, where mapping the address to a physical memory address is performed by a hardware interposer.

The above limitations advantageously enable a hardware interposer which recognizes access to addresses and remaps them to physical memory addresses. After the hardware interposer remaps addresses, read-only access to the physical memory ensures that partition-originated reads retrieve worker-written bytes, as intended. Other than manipulating a few bits of the MMU-provided address for certain ranges, no other modification is needed; the system works maintaining essentially no state in hardware.

Example 3: The limitations of Example 1, where the configuring is performed offline and the memory management unit is statically configured.

The above limitations advantageously enable security improvements since only static MMU configuration needs to be maintained, avoiding having to maintain any MMU-reconfiguring code in binaries, restricted to initialization-only code, which is then not accessible. Therefore, no MMU-reprogramming code would remain post-initialization executable in binaries, removing attack vectors through runtime control-flow compromise. Furthermore, the statically configured MMU requires no additional circuitry.

Example 4: The limitations of Example 1, where the access control is equivalent to a product of N and D mappings of workers to partitions.

The above limitations advantageously enable access control of N workers and D partitions to physical memory by a N plus D mapping of workers to partitions that is equivalent to a product of N and D mappings of workers to partitions. The reduction in the number of mappings avoids runtime configuration of the MMU and reducing the risk of nefarious attacks.

Example 5: The limitations of Example 1, where addresses of the N regions are consecutive.

The above limitations advantageously enable condensing of the regions, reducing the number of mappings and saving computer resources. Additionally, the limitations realize the benefits described with respect to Examples 1-4.

Example 6: A computer program product comprising one or more computer readable storage media, and program instructions collectively stored on the one or more computer readable storage media, the program instructions executable by a processor to cause the processor to perform the method according to any of Examples 1-5. The computer program product of Example 6 realizes the benefits described with respect to Examples 1-5. The computer program product of Example 6 can advantageously be implemented into a variety of computer program products.

Example 7: A computer system comprising a processor and one or more computer readable storage media, and program instructions collectively stored on the one or more computer readable storage media, the program instructions executable by the processor to cause the processor to perform the method according to any of Examples 1-5. The computer system of Example 7 realizes the benefits described with respect to Examples 1-5. The computer system of Example 7 can advantageously be implemented into a variety of computer devices.

Example 8: A computer-implemented method that comprises configuring a configuration of a crossbar of a memory management unit comprising a set of regions of N workers and D partitions. The method further comprises writing by a worker, to D partitions in the set of regions of the access control. The method further comprises reading by a partition, N regions in the set of regions of the access control where each of the N regions is assigned an address that is mapped to a physical memory address and wherein an access control is achieved by the configuration of a N plus D mapping of workers to partitions of the crossbar of the memory management unit. The method further comprises where mapping the address to a physical memory address is performed by a hardware interposer. The method further comprises wherein the configuring is performed offline and the memory management unit is statically configured. The above limitations realize the technical benefits described with respect to Examples 1-5.

Example 9: A computer program product comprising one or more computer readable storage media, and program instructions collectively stored on the one or more computer readable storage media, the program instructions executable by a processor to cause the processor to perform the method according to Example 8. The computer program product of Example 9 realizes the technical benefits described with respect to Examples 1-5. The computer program product of Example 9 can advantageously be implemented into a variety of computer program products.

Example 10: A system comprising one or more processors and one or more computer-readable storage media collectively storing program instructions which, when executed by the one or more processors, are configured to cause the one or more processors to perform the method according to Example 8. The system of Example 10 realizes the benefits of Examples 1-5. The system of Example 10 can advantageously be implemented into a variety of computing devices.

Aspects of the present disclosure can be implemented in a variety of technical use cases. The following use cases are merely exemplary and are not intended to limit the scope of the disclosure.

In a use case, the crossbar of a memory management unit of a microprocessor is configured with 2 workers and 4 partitions crossbar for multiple instances of disjoint categories of processes to access shared resources securely. The different categories of processes are assigned to form crossbars of permissions, typically in read and write pairs. Each crossbar region is 4K bytes. The configuration includes an interposer which recognizes access to fictive addresses and remaps them to proper physical ones. Each of the regions is writable by one particular worker, even if there are different partitions for each of its regions (pipes). Physical addresses in MMU mappings of these regions are real: they correspond to chips' actual physical addresses. A partition reads a region in the set of regions of the crossbar where a redundant set of read-only mappings is added, to different virtual addresses which map to the same crossbar, but organized along the columns of the original crossbar. The 'real' (physical) addresses registered for this region do not correspond to actual physical memory, but their ordering allows condensing all regions readable by a single partition to a consecutive range of addresses. Access control of reading and writing is achieved by the configuration of a 2 plus 4 mapping of workers to partitions of the crossbar of the memory management unit. Since each reader-dedicated MMU range merges only pipes (regions) which were readable by the range-owning reader, there is no security change: access control of the crossbar is preserved. Once constructed offline, the fictive-to-physical address mapping may be embedded into the hardware interposer. Only a static MMU configuration needs to be maintained, avoiding having to maintain any MMU-reconfiguring code in binaries at runtime. The configurations of the MMU and the interposer are performed offline, and the mappings embedded into the interposer. The MMU requires no additional circuitry.

In another use case, the crossbar of a memory management unit of a microprocessor is configured with 2 workers and 4 partitions crossbar for multiple instances of disjoint categories of processes to access shared resources securely.

The different categories of processes are assigned to form crossbars of permissions, typically in read and write pairs. For example, each crossbar region is 4K bytes. The configuration includes an interposer which recognizes access to fictive addresses and remaps them to proper physical ones. Each of the regions is writable by one particular worker, even if there are different partitions for each of its regions (pipes). A redundant set of write-only mappings is added, to different virtual addresses which map to the same crossbar. The 'real' (physical) addresses registered for this region do not correspond to actual physical memory, but their ordering allows condensing all regions writable by a single worker to a consecutive range of addresses. A partition reads a region where the physical addresses in MMU mappings of these regions are real: they correspond to the actual physical addresses of the physical memory. Access control of reading and writing is achieved by the configuration of a 2 plus 4 mapping of workers to partitions of the crossbar of the memory management unit. Since each reader-dedicated MMU range merges only pipes (regions) which were readable by the range-owning reader, there is no security change: access control of the crossbar is preserved. Only a static MMU configuration needs to be maintained, avoiding having to maintain any MMU-reconfiguring code in binaries at runtime. The configurations of the MMU and the interposer are performed offline, and the mappings embedded into the interposer. The MMU requires no additional circuitry.

The present disclosure provides for a method, a machine-readable medium, and a system for Condensed Memory-management Protection in Multi-tenant Systems.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides Condensed Memory-management Protection in Multi-tenant Systems. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made. Available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of Application Programming Interfaces (API). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

FIG. 2 depicts a diagram in an environment in accordance with an illustrative embodiment. In a particular embodiment, the components of the diagram 220 show aspects of the Application 200 of FIG. 1.

In the illustrated embodiment, a crossbar that provides read and write to memory access control comprises a mapping of N worker processes 230 comprising of worker 1 and worker 2 each with a write pipe 270 to D partitions 240 each with a read pipe 250 to create the product of N and D memory regions 260 to separate all worker-process pipes into their own physical memory (pages), and simultaneously to individual MMU regions. The region for worker 1 to partition 2 is only writable by worker 1 and readable by partition 2. Each pipe (region) has its own MMU control set up for it. There is no sharing and MMU regions do not overlap at all. (Since this combination differs for each region, one may not combine any of those within MMU controls.)

In embodiments, workers are allowed to write all pipes originating from them, regardless of the intended partition recipient. In other words, even if the D writable regions from each worker lead to different partitions, logically they are all owned and controlled fully by a single worker. For example, the separate 1>1 . . . 1>3 regions, while targeting different partitions' pipes, are all writable by worker 1. While writable by different workers, partition 1 is allowed to read both 1>1 and 2>1 even if their designated writers differ.

Conversely, in embodiments, partitions are allowed to read every pipe leading to them, even if the bytes backing those are in different regions. (Particularly, from an MMU perspective, these regions are scattered across the address space but they are all readable.) Similar to the logical collation for workers, partitions are assumed to own—in a read-only sense—the pipes leading to them.

Figure 3:
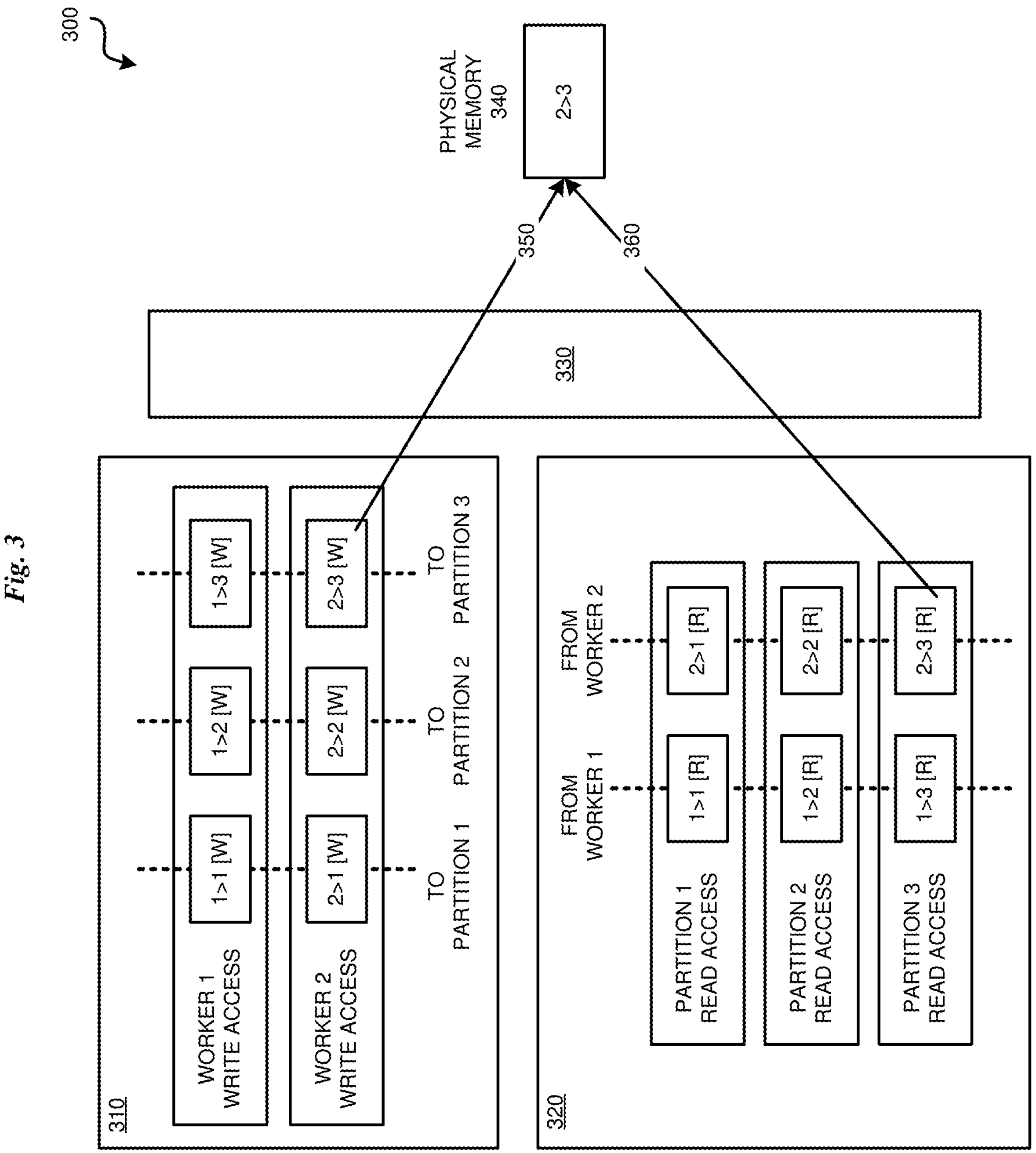
FIG. 3 depicts a diagram in an environment in accordance with an illustrative embodiment.

FIG. 3 depicts a diagram in an environment in accordance with an illustrative embodiment. In a particular embodiment, the components of the diagram 300 show aspects of the Application 200 of FIG. 1.

In the illustrated embodiment, the condensed worker-writable memory regions 310 comprises D workers, worker 1 and worker 2, and N partitions, partition 1, partition 2 and partition 3 for a total of 6 regions in the MMU access control crossbar. The "rows" within writable consecutive regions are condensed, one for each writer. In embodiments, a worker writes to D partitions in the set of regions of the access control. Each of these regions is writable by one particular worker, even if there are different partitions for each of its regions (pipes). For example, the region 2>3[W] denotes a writable address mapping (350) to physical memory address 2>3 (340). In embodiments, physical addresses in MMU mappings of these regions are real: they correspond to the memory chip's actual physical addresses.

In an embodiment, condensed partition-readable memory regions 320 where a redundant set of read-only mappings is added to different virtual addresses which map to the same crossbar, but organized along the columns of the original crossbar. The 'real' (physical) addresses registered for this region do not correspond to actual physical memory, but their ordering allows condensing all regions readable by a single partition to a consecutive range of addresses. In other words, the fictive physical addresses for each reader form a single MMU-perceived region. Since reader-oriented ranges are all under identical ownership, they may be condensed to one MMU region for each reader. Since each reader-dedicated MMU range merges only pipes (regions) which were readable by the range-owning reader, there is no security change: access control of the crossbar is preserved. For MMU purposes, the two set of address translations are entirely different, but N of the write-capable ones (D regions each), and D of the read-capable ones (N regions each) together describe the equivalent of the original crossbar. Therefore, MMU-based enforcement of access rights requires no further change: the MMU does not need to be aware of the fictive nature of read-only addresses for proper operation, but it fully recreates the access-restriction setup of the N*D-element crossbar otherwise. Thus, a partition reads N regions in the set of regions of the access control wherein each of the N regions is assigned an address that is mapped to a physical memory address and wherein the access control is achieved by a N plus D mapping of workers to partitions.

In some embodiments, an interposer 330 which recognizes access to fictive addresses, remaps them to proper physical ones 360. After the hardware interposer remaps addresses, read-only access to the physical memory ensures that partition-originated reads retrieve worker-written bytes, as intended. Other than manipulating a few bits of the MMU-provided address for certain ranges, no other modification is needed; and no state is maintained in hardware.

In an embodiment, the configuring is performed offline and the configuration is static. Once constructed offline, the fictive-to-physical address mapping may be embedded into the hardware interposer. Only a static MMU configuration needs to be maintained, avoiding having to maintain any MMU-reconfiguring code in binaries at runtime, restricted to initialization-only code, which is then not accessible. Therefore, no MMU-reprogramming code would remain post-initialization executable in binaries, removing attack vectors through runtime control-flow compromise. In some embodiments, the MMU is statically configurated by using an off-the-shelf and commercially available MMU without additional circuitry.

In another embodiment, the condensed partition-readable memory regions where a redundant set of write-only mappings is added to different virtual addresses which map to the same crossbar, but organized along the columns of the original crossbar. The 'real' (physical) addresses registered for this region do not correspond to actual physical memory, but their ordering allows condensing all regions writable by a single worker to a consecutive range of addresses. A partition reads a region where the physical addresses in MMU mappings of these regions are real: they correspond to the actual physical addresses of the physical memory. Since each reader-dedicated MMU range merges only pipes (regions) which were readable by the range-owning reader, there is no security change: access control of the crossbar is preserved.

Figure 4:
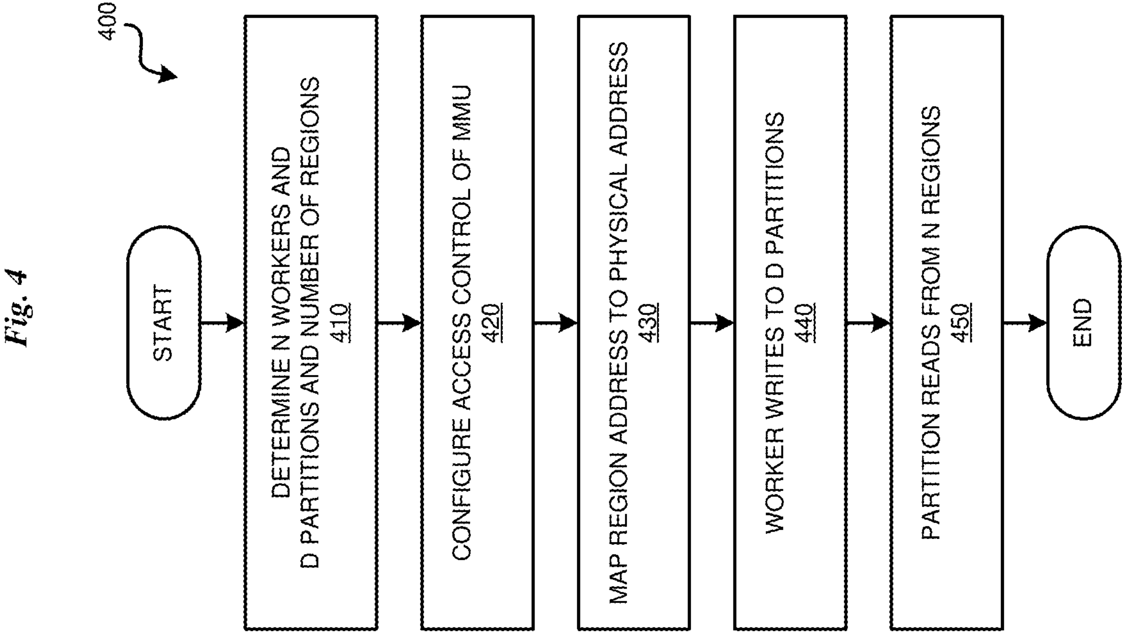
FIG. 4 depicts a flowchart diagram in accordance with an illustrative embodiment.

FIG. 4 depicts a flowchart diagram in an environment in accordance with an illustrative embodiment. In a particular embodiment, the components of the diagram 400 show aspects of the Application 200 of FIG. 1.

In the illustrated embodiment, the process starts at block 410, to determine N workers and D partitions and number of regions of a multi-tenant runs software where multiple instances of essentially identical code are executed by different owners. In embodiments, N worker processes and D partitions, with workers requesting services by writing requests into partition-readable pipes. Typically, N is limited by available hardware, up to a reasonable limit on engine/resource sharing, and D grows with the intended breadth of virtualization. (Since D is not directly related to simultaneously active processes, it may be considerably higher than the fundamentally CPU-constrained N.) At block 420, configure access control of the MMU is performed. In embodiments, N worker processes and D partitions creates a product of N and D number of memory regions to separate all worker-process pipes into their own physical memory (pages), and simultaneously to individual MMU regions.

Next at block 430, the process maps the region address to physical address of memory. Concurrently, at block 440, the worker writes to D partitions. In embodiments, physical addresses in MMU mappings of these regions are real: they correspond to the memory chip's actual physical addresses. In other embodiments, a redundant set of write-only mappings is added, to different virtual addresses which map to the same crossbar by using a hardware interposer. The 'real' (physical) addresses registered for this region do not correspond to actual physical memory, but their ordering allows condensing all regions writable by a single worker to a consecutive range of addresses.

Next at block 450, the partition reads from N regions. In an embodiment, a partition reads a region where a redundant set of read-only mappings is added, to different virtual addresses which map to the same crossbar using an interposer, but organized along the columns of the original crossbar. The 'real' (physical) addresses registered for this region do not correspond to actual physical memory, but their ordering allows condensing all regions readable by a single partition to a consecutive range of addresses. In a different embodiment, a partition reads a region where the physical addresses in MMU mappings of these regions are real: they correspond to the actual physical addresses of the physical memory. The process then terminates.

Figure 5:
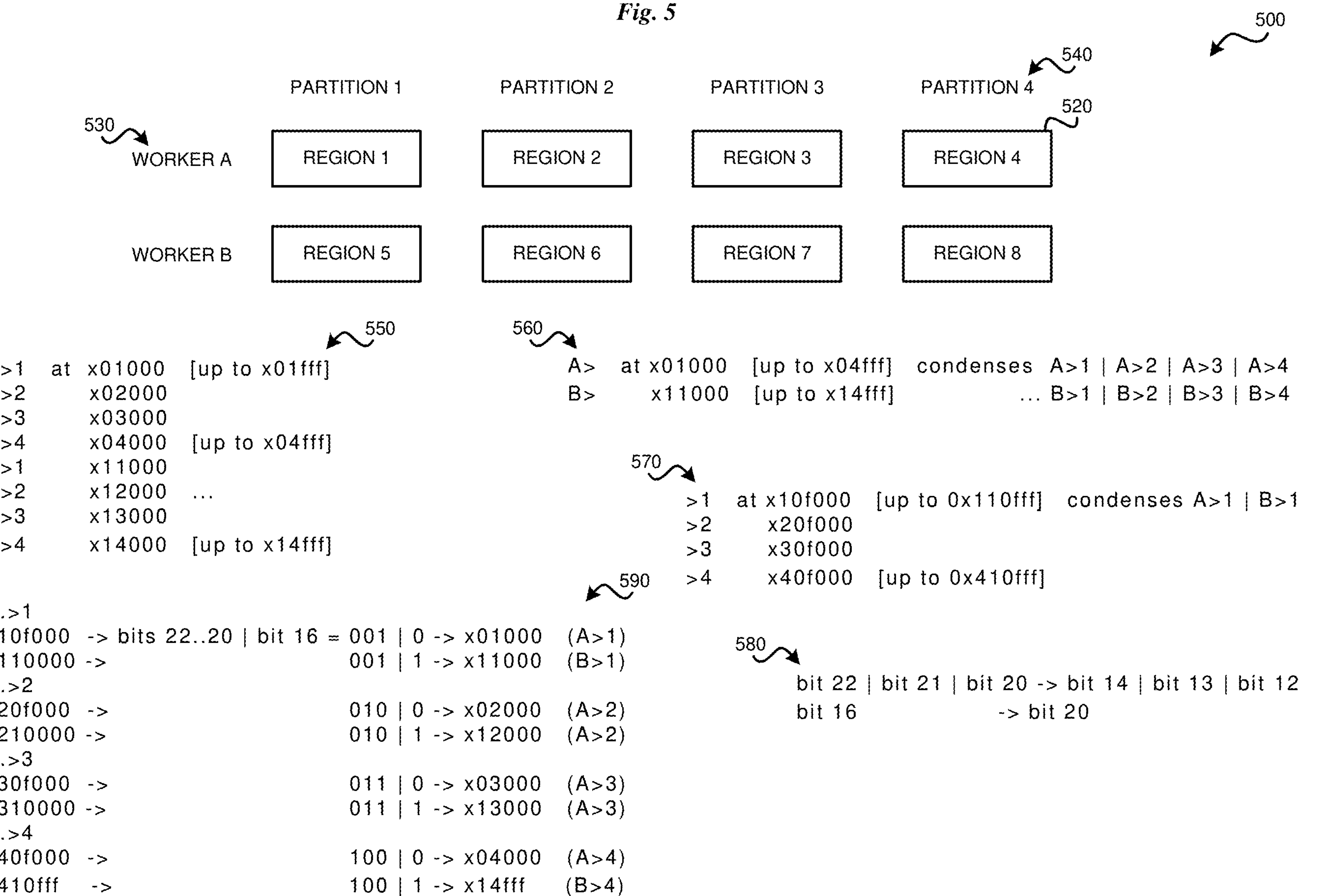
FIG. 5 depicts a diagram in accordance with an illustrative embodiment.

FIG. 5 depicts a diagram in accordance with an illustrative embodiment. In a particular embodiment, the components of the diagram 500 are representative of aspects of the Application 200 of FIG. 1.

In the illustrated embodiment, the crossbar comprises of 2 workers (530), worker A and worker B, and partitions 1 to 4 (540) for a total of 2×4 regions (520). Each cross-bar indexed region is of 4K bytes, so the natural granularity in this system aligns each region-start address to (hexadecimal) x . . . 000. The addresses of the full crossbar (550), where each region is x1000 bytes, ranges from A>1 at x01000 to B>4 at x14000.

The write enabled regions (560) are condensed to, for example, A>1|A>2|A>3|A>4, and are each x4000 bytes. Mappings are to real physical addresses; no additional translation is necessary.

In embodiments, read-enabled regions are mapped (570) to fictive physical address ranges (each with x2000 bytes, from the two 4K ranges in each column). For example, for partition 1, at x10f000, condenses to A>1|B>1. Each fictive region is consecutive, and maps to a single MMU region. Note the sparse layout of fictive address ranges; it leads to the remapping functions at (580).

Bits are counted least to most significant, 0-indexed: 0 is the least significant bit; bit 12 is the KB-range delimiter, and so on. Remapping clearly justifies selecting "wasteful", non-consecutive sets of fictive addresses. In some examples, physical addresses higher than the fictive x100000 are to be remapped (590); this leads to the remapped regions for reader columns such as for partition 1, x10f000→bits 22 . . . 20|bit 16=001|0→x01000 (A>1). One may verify that the read-only fictive accesses remap to the proper physical ones of the original crossbar using an interposer, while their fictive originals are perceived as consecutive ranges by the MMU. Therefore, MMU-based enforcement of access rights requires no further change: the MMU does not need to be aware of the fictive nature of read-only addresses for proper operation, but it fully recreates the access-restriction setup of the N*D-element crossbar otherwise. Thus, the 'real' (physical) addresses registered for this region do not correspond to actual physical memory, but their ordering allows condensing all regions readable by a single partition to a consecutive range of addresses. In other words, the fictive physical addresses for each reader form a single MMU-perceived region. Since reader-oriented ranges are all under identical ownership, they may be condensed to one MMU region for each reader. Therefore, according to the embodiment, the access control is achieved by a 2 plus 4 mapping of workers to partitions.

Figure 6:
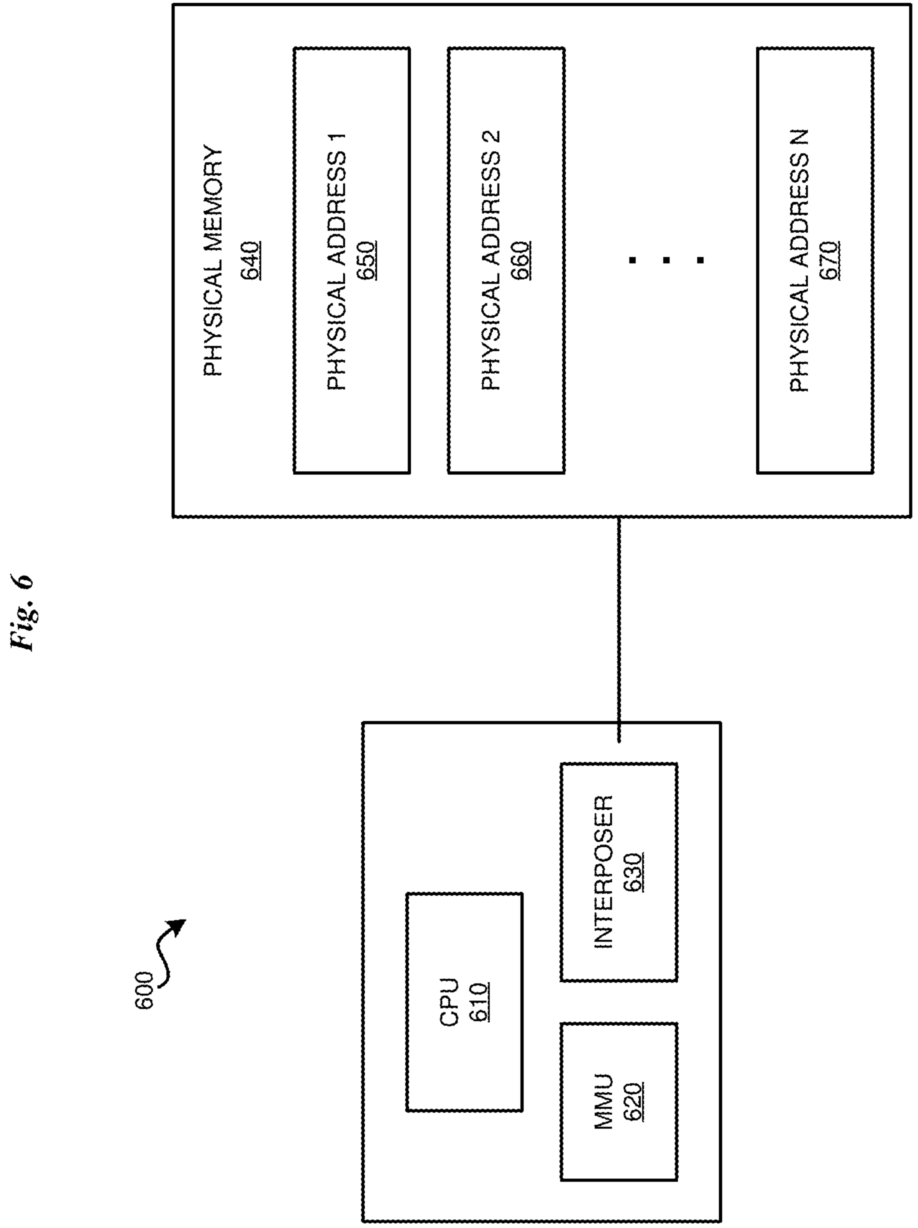
FIG. 6 depicts a system diagram in accordance with an illustrative embodiment.

FIG. 6 depicts a system diagram in accordance with an illustrative embodiment. In a particular embodiment, the components of the diagram 600 are representative of aspects of the Application 200 of FIG. 1.

In the illustrated embodiment, the system comprises a microprocessor further comprising a central processing unit (CPU) 610, a memory management unit (MMU) 620, and an interposer 630. The MMU and the interposer are connected to the physical memory 640 through physical address 1 650, physical address 2 660, up to physical address N 670.

In embodiments, the memory crossbar connects the multiple Load/Store (L/S) units of the processor to the multiple memory sections. For example, each L/S unit is hardwired to a distribution bus which stretches across the width of the chip. Each memory section, has a vertical bus with a switch connected to one of these horizontal buses. On a given cycle, the switches can be set so that each L/S unit has a direct connection to a memory section, as long as every L/S unit is accessing a different section. The crossbar of the MMU has different categories of processes assigned to form crossbars of permissions, typically in read and write pairs.

In embodiments, the interposer comprises of a hardware embedded address translation using access originator translation. With a hardware interposer remapping fictive addresses to effective real ones, the original fine-grained access control of the original crossbar is recreated. The MMU configuration is simplified, by tracking N+D (worker+partition) mappings, instead of N times D mappings. This eliminates the need for MMU reconfiguration, to simplify the MMU setup.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

configuring a configuration of a crossbar of a memory management unit comprising a set of regions, the set of regions comprising of workers and partitions;

writing by a worker, to the partitions in the set of regions of the crossbar; and reading by a partition, the workers in the set of regions of the crossbar, wherein each of the workers is assigned an address that is mapped to a physical memory address, wherein an access control is achieved by the configuration of a mapping of workers to partitions of the crossbar of the memory management unit, and wherein the access control is equivalent to a product of mappings of the workers to the partitions.

2. The computer-implemented method of claim 1, wherein mapping the address to a physical memory address is performed by a hardware interposer.

3. The computer-implemented method of claim 1, wherein the configuring is performed offline and the memory management unit is statically configured.

4. The computer-implemented method of claim 1, wherein addresses of the workers are consecutive.

5. A computer program product comprising one or more computer readable storage media, and program instructions collectively stored on the one or more computer readable storage media, the program instructions executable by a processor to cause the processor to perform operations comprising:

configuring a configuration of a crossbar of a memory management unit comprising a set of regions, the set of regions comprising of workers and partitions;

writing by a worker, to the partitions in the set of regions of the crossbar; and reading by a partition, the workers in the set of regions of the crossbar, wherein each of the workers is assigned an address that is mapped to a physical memory address, wherein an access control is achieved by the configuration of a mapping of workers to partitions of the crossbar of the memory management unit, and wherein the access control is equivalent to a product of mappings of the workers to the partitions.

6. The computer program product of claim 5, wherein mapping the address to a physical memory address is performed by a hardware interposer.

7. The computer program product of claim 5, wherein the configuring is performed offline and the memory management unit is statically configured.

8. The computer program product of claim 5, wherein addresses of the workers are consecutive.

9. A computer system comprising a processor and one or more computer readable storage media, and program instructions collectively stored on the one or more computer readable storage media, the program instructions executable by the processor to cause the processor to perform operations comprising:

configuring a configuration of a crossbar of a memory management unit comprising a set of regions, the set of regions comprising of workers and partitions;

writing by a worker, to the partitions in the set of regions of the crossbar; and reading by a partition, the workers in the set of regions of the crossbar, wherein each of the workers is assigned an address that is mapped to a physical memory address, wherein an access control is achieved by the configuration of a mapping of workers to partitions of the crossbar of the memory management unit, and wherein the access control is equivalent to a product of mappings of the workers to the partitions.

10. The computer system of claim 9, wherein mapping the address to a physical memory address is performed by a hardware interposer.

11. The computer system of claim 9, wherein the configuring is performed offline and the memory management unit is statically configured.

12. The computer system of claim 9, wherein addresses of the workers are consecutive.

13. A computer-implemented method comprising:

configuring a configuration of a crossbar of a memory management unit comprising a set of regions, the set of regions comprising of workers and partitions;

writing by a worker, to the partitions in the set of regions of the crossbar; and reading by a partition, the workers in the set of regions of the crossbar, wherein each of the workers is assigned an address that is mapped to a physical memory address, wherein an access control is achieved by the configuration of a mapping of workers to partitions of the crossbar of the memory management unit, and wherein the access control is equivalent to a product of mappings of the workers to the partitions.

14. The computer-implemented method of claim 13, wherein mapping the address to a physical memory address is performed by a hardware interposer.

15. The computer-implemented method of claim 13, wherein the configuring is performed offline and the memory management unit is statically configured.

16. The computer-implemented method of claim 13, wherein addresses of the partitions are consecutive.

17. A computer system comprising a processor and one or more computer readable storage media, and program instructions collectively stored on the one or more computer readable storage media, the program instructions executable by the processor to cause the processor to perform operations comprising:

configuring a configuration of a crossbar of a memory management unit comprising a set of regions, the set of regions comprising of workers and partitions;

writing by a worker, to the partitions in the set of regions of the crossbar; and reading by a partition, the workers in the set of regions of the crossbar, wherein each of the workers is assigned an address that is mapped to a physical memory address, wherein an access control is achieved by the configuration of a mapping of workers to partitions of the crossbar of the memory management unit, and wherein the access control is equivalent to a product of mappings of the workers to the partitions.

18. The computer system of claim 17, wherein mapping the address to a physical memory address is performed by a hardware interposer.

19. The computer system of claim 17, wherein the configuring is performed offline and the memory management unit is statically configured.

20. The computer system of claim 17, wherein addresses of the partitions are consecutive.

* * * * *